United States Patent Office 3,184,280
Patented May 18, 1965

3,184,280
SOLID DYEINGS AND PRINTS ON POLY-
HYDROXYLATED MATERIALS
Werner Zerweck, Frankfurt am Main, Richard Fleischhauer, Frankfurt am Main, Fechenheim, and Heinz Bender, Bergen-Enkheim, Kreis Hanau, Germany, assignors to Cassella Farbwerke Mainkur Aktiengesellschaft, Frankfurt am Main, Fechenheim, Germany, a company of Germany
No Drawing. Filed Jan. 30, 1962, Ser. No. 169,931
Claims priority, application Germany, Feb. 2, 1961, C 23,313
9 Claims. (Cl. 8—54.2)

This invention relates to a process for the manufacture of solid dyeings and prints on polyhydroxylated materials.

In particular, this invention relates to the dyeing and printing on polyhydroxylated materials, especially on fibres and fabrics of natural or regenerated cellulose. This process comprises treating the polyhydroxylated materials with preparations, such as solutions, suspensions and printing pastes of organic dyestuffs containing at least one radical having the formula

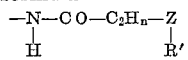

wherein Z is a member of the group consisting of $SO_2$, SO, sulphur and oxygen, R' is a radical of the group consisting of alkyl, aralkyl, cycloalkyl and aryl, and $n$ is 2 or 4, and by fixing the dyeings or prints on the polyhydroxylated material, if desired, in the presence of salts of inorganic or organic acids especially such having an alkaline action and other agents customary in dye and print works either by heating to temperatures above 100° C. or by steaming or in the presence of an alkaline reagent at temperatures below 100° C.

The dyestuffs being utilized for the process of the present invention may belong to diversified series, such as the nitro, azine, anthraquinone, cyanine and especially the azo series.

For the production of the dyestuffs utilizable according to the present invention halides of carboxylic acids of the formula

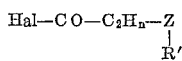

or the corresponding carboxylic acid anhydrides wherein Z, R' and $n$ have the above meaning may be allowed to react with suitable dyestuffs or dyestuff intermediates containing primary amino groups and, if need be, the reaction products of the intermediates may be used for the synthesis of the dyestuffs.

The following table enumerates some of the radicals which may be thus introduced:

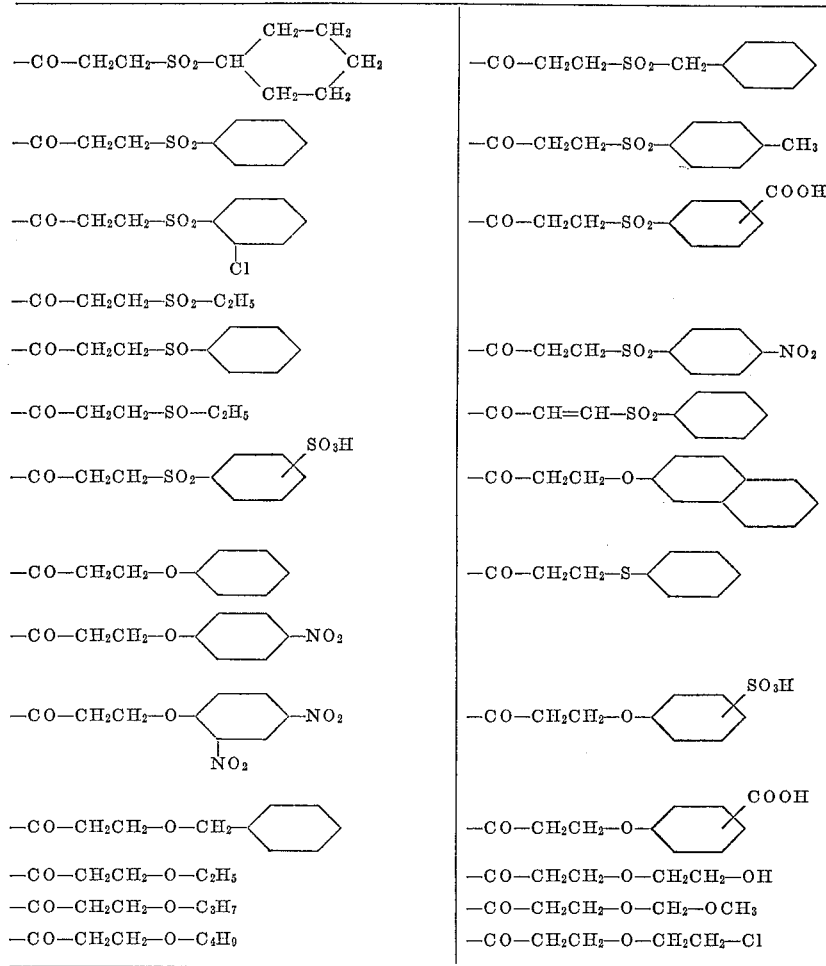

The dyestuffs to be used may contain in complex linkage metals, especially copper, nickel, cobalt or chrome. This applies particularly to dyestuffs of the phthalocyanine and azo series. Dyeings or prints achieved with dyestuffs containing metal-complex forming groups may be also after-treated on the fibre with metal salts, especially with copper salts in order to increase, for example, their fastness to light.

The dyestuffs may be used as aqueous suspensions, printing pastes or solutions. It is generally of advantage to start from dyestuffs that are readily soluble in water which necessitates the presence of carboxylic acid or especially sulphonic acid groups or also of sulphonamide groups in the dyestuff molecule. The optimum number of solubilizing groups depends on the structure and the size of the dyestuff molecule. The selection of the dyestuffs makes it possible to produce various shades ranging from yellow to orange, red, violet, blue, green, brown, grey and black.

According to the present invention polyhydroxylated materials, in particular fibres or fabrics of natural or regenerated cellulose may be printed with aqueous printing pastes of dyestuffs containing the radical having the formula

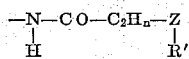

or impregnated with aqueous solutions or suspensions of these dyestuffs together with conventional auxiliaries that are used in dye and print works, such as salts, alginate thickening, tragacanth, urea or other substances with hygroscopic action, for example dinaphthyl-methane-sulphonic acids may be added. Then the dyestuffs are fixed onto the fibre. This operation is carried out either by heating the dyed material while it is in a wet or dry state or treating with an alkaline reagent or simultaneously by both.

Whether the fixation can be carried out in a weakly alkaline, neutral or even weakly acid medium depends on the other reaction conditions, especially on the temperature. Thus, when heating the printed or dyed fabric to temperatures above 105° C. it is frequently unnecessary to add an agent having a stronger alkaline action. When steaming at about 100–105° C. and especially when dyeing at temperature lower than 100° C. it is, however, expedient or necessary to add a reagent that has an alkaline reaction, such as ammonium acetate, sodium acetate, sodium bicarbonate, sodium carbonate, ammonium or alkali-metal phosphates or even sodium hydroxide, potassium hydroxide, ammonia, and soluble ammonium compounds.

The impregnation with the dyestuff solutions and the chemicals, such as urea, sodium sulfate, sodium chloride and alkaline reagents may be effected in the same bath or in separate baths. Intermediate drying of the dyed or printed material before fixing is in many cases advantageous.

After fixing, the fabric is thoroughly rinsed with cold or hot water and soaped.

The following examples are given for the purpose of illustrating the present invention but the invention is not restricted to these examples. All degrees are to be understood to refer to degrees Centigrade.

*Example 1*

A fabric of cotton or viscose-rayon is printed with a printing paste containing in 1 kg. printing color about 25–50 g. of a monoazo dyestuff obtained by combining 1 mol of the diazo compound of 1-aminobenzene-4-sulfonic acid with 1 mol of 2-[β-(2'-nitrophenylsulfonyl)-propionylamino]-5-hydroxynaphthalene-7-sulfonic acid in the presence of sodium acetate, furthermore about 400 g. alginate thickening and water, 100 g. urea and 20 g. sodium bicarbonate or 20 g. sodium carbonate.

After drying, the material is steamed for 5 minutes at 100–105° C. rinsed cold and hot, soaped whilst boiling and dried.

A full orange print of very good wet fastness and good fastness to light is obtained.

When the fixation is carried out by heating for about 5 minutes to 120–140° or for half a minute to 160° C. instead of steaming and by subsequent rinsing, soaping and drying, orange prints are obtained having likewise full shades and being fast to wet processing.

Prints of a similar shade and corresponding properties are obtained when utilizing instead of the mentioned dyestuff such wherein one of the following coupling components is used:

2-[β-(methylsulfonyl)-propionylamino]-5-naphthol-7-sulfonic acid,
2-[β-(phenylsulfoxyl)-propionylamino]-5-naphthol-7-sulfonic acid,
2-[(4'-nitrophenylsulfonyl)-propionylamino]-5-naphthol-7-sulfonic acid,
2-[(benzylsulfonyl)-propionylamino]-5-naphthol-7-sulfonic acid,
2-[(cyclohexylsulfonyl)-propionylamino]-5-naphthol-7-sulfonic acid,
2-[β-(2'-nitrophenoxy)-propionyl]-amino-5-naphthol-7-sulfonic acid,
2-[β-(2'-chlorophenoxy)propionyl]-amino-5-naphthol-7-sulfonic acid,
2-(β-phenylmercapto-propionyl)-amino-5-naphthol-7-sulfonic acid,
2-(β-methylmercapto-propionyl)-amino-5-naphthol-7-sulfonic acid,
2-[(β-phenylsulfonyl)-acryloylamino]-5-naphthol-7-sulfonic acid, The dyestuffs may be prepared in the usual manner from the corresponding intermediate products and they are orange water-soluble powders.

The coupling components used are obtained by allowing 2-amino-5-hydroxynaphthalene-7-sulfonic acid to react with the corresponding acid halides in an aqueous solution in the presence of sodium acetate. The sodium salts are very easily soluble in water.

When utilizing the monoazo dyestuff which is obtained by combining the diazo compound of 1 mol 1-amino-3-(ethylsulfonyl - propionylamino) - benzene - 6 - sulfonic acid with 1 mol 2-(β-ethyl-sulfonylpropionylamino)-5-hydroxynaphthol - 7 - sulfonic acid, very deep reddish orange shades are obtained.

*Example 2*

When utilizing instead of the dyestuff mentioned in Example 1, paragraph 1, 30 g. of the monoazo dyestuff which is obtained by combining the diazo compound of 1 mol 1 - amino-3-[(β-phenylsulfonyl)-propionylamino]-benzene-6-sulfonic acid with 1 mol 1-(4'-sulfophenyl)-5-pyrazolone - 3 - carboxylic acid, a yellow print of very good fastness to light and to washing and of a very good dischargeability is obtained.

A somewhat more greenish yellow print is obtained when utilizing a dyestuff obtained as described in the preceding example but using as coupling component 1-(2', 5'-dichloro-4'-sulfophenyl)-3-methyl-5-pyrazolone instead of 1-(4'-sulfophenyl)-5-pyrazolone-3-carboxylic acid.

Prints of corresponding properties are obtained when utilizing a dyestuff prepared in the same manner as the dye in paragraph 1 of this example but substituting as diazo component 1-amino-3-(β-phenoxypropionylamino)-benzene-6-sulfonic acid is employed. When utilizing 1-(2',5' - dichloro - 4' - sulfophenyl) - 3 - methyl - 5 - pyrazolone as coupling component, also in this case a somewhat more greenish yellow shade is obtained.

When starting from such yellow monoazo dyestuffs wherein as diazo component there is used for example 1-amino-3-(methylsulfonylpropionyl)-amino-6-methyl-benzene,
1-amino-3-(methylsulfonylpropionyl)-amino-4-methoxy-benzene,
1-amino-4-(methylsulfonylpropionyl)-amino-3-chloro-benzene, or
1-amino-3-(phenylsulfonylpropionyl)-aminobenzene-6-carboxylic acid, and as coupling component 1-(2',5'-disulfophenyl)-5-pyrazolone-3-carboxylic acid, likewise greenish yellow prints are obtained which are fast to light and wet processing.

Example 3

A rayon fabric of regenerated cellulose is printed with a printing paste containing per kg. printing color 50 g. of a tetrakisazo dyestuff the preparation of which is described in the following paragraph. Urea, alginate thickening and about 10-20 g. sodium bicarbonate are used as auxiliary agents. Black prints are obtained which are dischargeable and fast to washing.

The dyestuff may be prepared as follows:

35.9 kg. of 4,4'-diaminophenylamine-2,3'-disulfonic acid are tetrazotized, then the tetrazo compound is combined with an alkaline solution of 64 kg. 2-amino-8-naphthol-3,6-disulfonic acid, the precipitated disazo dyestuff is further tetrazotized and combined in an alkaline medium with 21.6 kg. m-diaminobenzene. The tetrakisazo dyestuff thus obtained is then precipitated, purified by washing with a common salt solution, dissolved again in water and reacted at 5-20° C. in the presence of sodium bicarbonate with excess ethyl-sulfonyl-propionic acid chloride. The dyestuff is salted out, filtered off and dried. It represents a dark water-soluble powder.

When starting from the dyestuff obtained by combining the tetrazo compound of 4,4'-diaminodiphenyl-3,3'-disulfonic acid with 2 mols of 2-[β-(methylsulfonyl)-propionylamino]-5-naphthol-7-sulfonic acid, vivid deep red shades are obtained.

Example 4

A rayon fabric of regenerated cellulose is printed with a printing paste containing per kg. printing color 50 g. of a disazo dyestuff being obtained by coupling in an acid medium 1 mol of the diazo compound of 4-nitraniline-2-sulfonic acid with 1 mol 1-amino-8-naphthol-3,6-disulfonic acid and by further combining the resultant monoazo dyestuff with the diazo compound of 1 mol 1-amino-3-(β-methyl-mercaptopropionyl)-aminobenzene-6-sulfonic acid in an alkaline medium. As auxiliary agents there are used urea, alginate thickening and about 10-20 g. sodium bicarbonate. Bluish-black prints are obtained which are dischargeable and fast to washing.

The dyestuff which is obtained by combining 1 mol 2-amino-5-naphthol-7-sulfonic acid at first in a weakly acid and subsequently in a weakly alkaline medium with 1 mol each of the diazo compound of 1-amino-3-(phenylsulfonylpropionylamino)-benzene-6-sulfonic acid yields very full covered red shades.

Example 5

Red prints which are fast to light are obtained when utilizing monoazo dyestuffs wherein the diazo components of the yellow dyestuffs mentioned in Example 2 have been combined in an acid medium with 2-amino-8-naphthol-6-sulfonic acid or 2-amino-8-naphthol-3,6-disulfonic acid and when proceeding moreover as indicated in Example 1.

Example 6

When utilizing for the printing paste about 40 g. of one of the dyestuffs

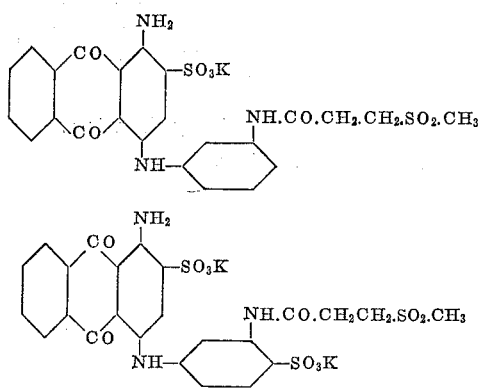

or

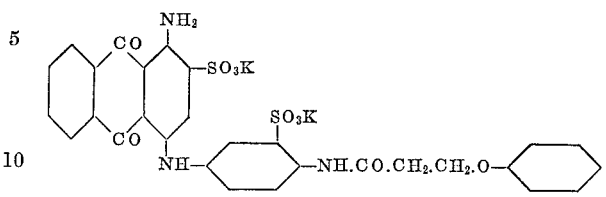

vivid blue prints of very good fastness to washing and to light are obtained.

Example 7

Cotton yarn is dyed for 1 hour at 25-70° C. in a bath containing per liter of the liquor 1% of the monoazo dyestuff which has been obtained by combining the diazo compound of 1 mol aniline-4-sulfonic acid with 1 mol 2-(β-phenylsulfonylpropionyl)-amino-5-naphthol-7-sulfonic acid, 200-300 g. Glauber's salt and 1-5 g. sodium carbonate. After rinsing and soaping, an orange dyeing is obtained which is fixed fast to washing. The sodium carbonate can be replaced by caustic soda lye. The dyeing may also be fixed by steaming at 100-105° C. after an intermediate drying.

Dyeings of similar shades and corresponding properties are obtained when utilizing instead of the mentioned dyestuff a dyestuff wherein as coupling component the 2-(β-phenylmercapto-propionyl)-amino-5-naphthol-7-sulfonic acid is used.

Example 8

A cotton fabric is impregnated or padded in a dye bath containing per liter 10 g. of one of the monoazo dyestuffs as described in Example 2, paragraphs 1 and 3, respectively, 100 g. anhydrous sodium sulfate, 100 g. urea and 5 g. sodium carbonate. Then the material is squeezed off and dried. The dyed material is then heated for 5 minutes to 140° C. or about half a minute to 160° C. After rinsing and soaping a yellow dyeing is obtained.

It is also possible to proceed in such a way that the cotton fabric is at first treated with the dye solution, squeezed off and dried, then padded with the solution of the chemicals, dried again and the dyeing is fixed by steaming or heating to about 140° C.

The dyeing process may be also effected by utilizing a dye liquor containing per liter about 5-10 g. of the dyestuff, 40 g. caustic soda lye of 33° Bé. and 10 g. anhydrous sodium sulfate. The cotton fabric is padded with this liquor at 20-30° C., squeezed, batched, wrapped in a polyethylene foil and stored for about 20-40 hours at 20-30° C. and subsequently rinsed and soaped.

Example 9

When utilizing a printing paste containing 30 g. of the copper compound of the monoazo dyestuff being prepared from the diazo compound of 1 mole 2-aminophenol-4-sulfonic acid and 1 mol 2-[(β-phenylsulfonyl)-propionylamino]-5-hydroxynaphthalene-7-sulfonic acid and subsequently treated in an acetic medium with copper sulfate, and when proceeding for the rest as indicated in Example 1, claret-reddish violet prints being fast to light are obtained.

Prints of a similar shade and corresponding properties are obtained when utilizing instead of the mentioned dyestuff such a dyestuff wherein the 2-(β-phenoxypropionyl)-amino-5-hydroxynaphthalene-7-sulfonic acid is used as coupling component.

Example 10

The nitro dyestuff of the formula

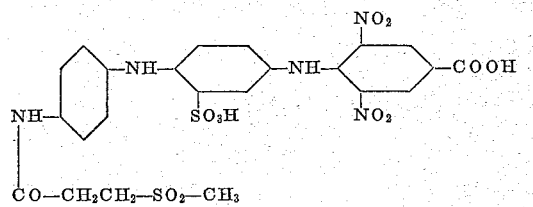

being obtained by unilateral reaction of 4,4′-diamino-diphenyl-amine-2-sulfonic acid with 4-chloro-3,5-dinitrobenzene-1-carboxylic acid and acylation of the resultant product with methyl-sulfonyl-propionylchloride yields, according to the printing process as described in Example 1, a yellow-brown print.

When utilizing instead of this nitro dyestuff an azine dyestuff of the formula

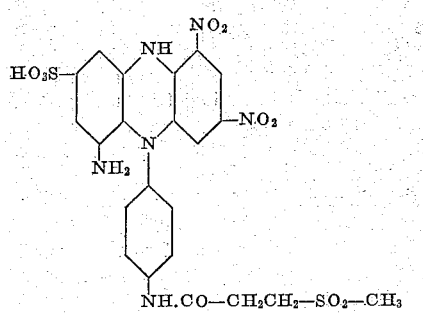

which is obtainable by condensation of 2,6-dinitro-1-chlorobenzene-4-sulfonic acid with 1-amino-4-(methyl-sulfonylpropionylamino)-benzene, subsequent reduction and by condensation of the resultant diaminodiphenylamine compound with 2,4,6-trinitroanisole, a brown print is obtained.

Example 11

A cotton fabric is printed as indicated in Example 1 with 1/50 mol of the dyestuff being obtained by condensation of copper-phthalocyanine-tetrasulfochloride with from 1 to 2.5 mols of 4,4′-diaminodiphenyl-2,2′-disulfonic acid, subsequent saponification of the unreacted sulfochloride groups by heating the product together with caustic soda lye, and by acylation of the free amino groups with phenylsulfonylpropionylchloride. After rinsing and soaping a turquoise blue print is obtained being fast to light and wet processing.

Similar turquoise blue prints result when utilizing dyestuffs which are obtained by condensing the copper-phthalocyanine-tetrasulfochloride with from 1 to 2.5 mols of 4,4′-diamino - 3,3′-dimethyldiphenyl-5,5′-disulfonic acid or 1,3-diamino-benzene-4-sulfonic acid, and subsequently saponifying the unreacted sulfo-chloride groups with caustic soda lye and acylating the resultant products with phenylsulfonylpropionylchloride.

It will be understood that this invention is susceptible to further modification and, accordingly, it is desired to comprehend such modifications within this invention as may fall within the scope of the appended claims.

We claim:
1. A process for dyeing and printing a polyhydroxylated material of fibrous structure which comprises treating the polyhydroxylated material with an organic dye that contains at least one substituent radical having the formula

$$-NH-CO-C_2H_n-ZR'$$

in which
ZR′ is a radical of the group consisting of alkanesulfonyl, cycloalkane sulfonyl, aralkanesulfonyl, arenesulfonyl, arenesulfinyl, arylthio and aryloxy, and $n$ is an integer of the group consisting of 2 and 4, and fixing the dye thereon by subjecting the thus treated polyhdroxylated material to the action of heat.

2. Process according to claim 1 wherein the fixing is carried out in the presence of an alkaline active salt of a member selected from the group consisting of an inorganic and an organic acid.

3. Process according to claim 1 wherein fixing is carried out by heating to temperatures above 100° C.

4. Process according to claim 3 wherein heating to temperatures above 100° C. is carried out by steaming.

5. Process according to claim 1 wherein fixing is carried out at temperatures below 100° C. in the presence of an alkaline reagent.

6. Process according to claim 1 wherein the polyhydroxylated material of fibrous structure is selected from the group consisting of natural and regenerated cellulose.

7. Process according to claim 1 wherein the polyhydroxylated materials are dried before the fixing process is carried out.

8. A process for dyeing and printing a polyhydroxylated material of fibrous structure which comprises treating the polyhydroxylated material with an organic dye of the group consisting of azo, nitro, azine, anthraquinone and cyanine dyes that contain at least one substituent radical having the formula $$-NH-CO-C_2H_n-ZR'$$

in which
ZR′ is a radical of the group consisting of alkanesulfonyl, cycloalkane sulfonyl, aralkanesulfonyl, arenesulfonyl, arenesulfinyl, arylthio and aryloxy, and $n$ is an integer of the group consisting of 2 and 4, and fixing the dye thereon by subjecting the thus treated polyhydroxylated material to the action of heat.

9. A process for dyeing a cellulosic material of fibrous structure which comprises treating the cellulosic material with a monoazo dye obtained by coupling equimolecular proportions of 2-[2-(2-nitrobenzenesulfonyl)propionylamino]-5-hydroxynaphthalene-7-sulfonic acid and the diazo compound of 1-aminobenzene-4-sulfonic acid, and fixing the dye thereon by heating the thus treated cellulosic material at a temperature about 100° C.

References Cited by the Examiner
UNITED STATES PATENTS

| | | | |
|---|---|---|---|
| 2,720,517 | 10/55 | Kartaschoff et al. | 260—199 X |
| 2,992,240 | 7/61 | Lodge | 8—1.252 |
| 3,007,762 | 11/61 | Wegmann et al. | 8—54.2 |
| 3,031,252 | 4/62 | Staeuble et al. | 8—1.2 |
| 3,040,019 | 6/62 | Neier | 8—1.2 |
| 3,040,024 | 6/62 | Riat et al. | 8—1.2 |
| 3,114,746 | 12/63 | Benz et al. | 8—1.28 |

NORMAN G. TORCHIN, *Primary Examiner.*

MORRIS O. WOLK, *Examiner.*